(12) United States Patent
Kobayashi (10) Patent No.: US 11,290,740 B2
(45) Date of Patent: Mar. 29, 2022

(54) IMAGE CODING APPARATUS, IMAGE CODING METHOD, AND STORAGE MEDIUM

(71) Applicant: CANON KABUSHIKI KAISHA, Tokyo (JP)

(72) Inventor: Yukifumi Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 165 days.

(21) Appl. No.: 16/909,584

(22) Filed: Jun. 23, 2020

(65) Prior Publication Data

US 2020/0413083 A1    Dec. 31, 2020

(30) Foreign Application Priority Data

Jun. 26, 2019    (JP) .............................. JP2019-119014

(51) Int. Cl.
*H04N 19/513*    (2014.01)
*H04N 19/176*    (2014.01)
*H04N 19/139*    (2014.01)
*H04N 19/109*    (2014.01)
*H04N 19/119*    (2014.01)

(52) U.S. Cl.
CPC ......... *H04N 19/513* (2014.11); *H04N 19/109* (2014.11); *H04N 19/119* (2014.11); *H04N 19/139* (2014.11); *H04N 19/176* (2014.11)

(58) Field of Classification Search
CPC .... G02B 7/282; H04N 19/109; H04N 19/119; H04N 19/139; H04N 19/176; H04N 19/43; H04N 19/513
See application file for complete search history.

(56) References Cited

U.S. PATENT DOCUMENTS 8,345,761 B2 *    1/2013    Sakamoto .............. H04N 5/144
                                                    375/240.16
8,634,469 B2 *    1/2014    Lu .......................... H04N 19/51
                                                    375/240.16
(Continued)

FOREIGN PATENT DOCUMENTS

JP    2018-032949 A    3/2018

OTHER PUBLICATIONS

Sakae Ohkubo et al., H.265/HEVC Textbook, pp. 48-51, Figs. 2-5 with Partial English Translation, First Edition Issued on Oct. 21, 2013, Cited in Specification in paragraph [0002].

*Primary Examiner* — Joon Kwon
(74) *Attorney, Agent, or Firm* — Cowan, Liebowitz & Latman, P.C.

(57) ABSTRACT

A detection unit successively selects each of a plurality of blocks of a target image as a target block and detects a motion vector of the target block using a reference image. During motion vector detection, a control unit performs control to partially store the reference image into a storage unit so as to achieve a state where a search range for the target block is stored. The detection unit selects each of the plurality of blocks as the target block in an order of raster scan for each of N regions obtained by dividing the target image in a horizontal direction. When a temporal distance between the target image and the reference image is a second distance that is longer than a first distance, a value of N is large compared to a case where the temporal distance is the first distance.

7 Claims, 8 Drawing Sheets

(56) References Cited

U.S. PATENT DOCUMENTS

| | | | |
|---|---|---|---|
| 2009/0154368 A1* | 6/2009 | Kim | H04L 41/509 370/252 |
| 2009/0226105 A1* | 9/2009 | Huang | H04N 19/139 382/236 |
| 2011/0261886 A1* | 10/2011 | Suzuki | H04N 19/61 375/240.16 |
| 2013/0022127 A1* | 1/2013 | Park | H04N 19/176 375/240.16 |
| 2013/0058413 A1* | 3/2013 | Guo | H04N 19/577 375/240.15 |
| 2013/0070856 A1* | 3/2013 | Sato | H04N 19/513 375/240.16 |
| 2014/0301657 A1* | 10/2014 | Hattori | H04N 19/593 382/239 |
| 2015/0010082 A1* | 1/2015 | Iwata | H04N 19/55 375/240.16 |
| 2018/0063547 A1* | 3/2018 | Kobayashi | H04N 5/145 |
| 2018/0103260 A1* | 4/2018 | Chuang | H04N 19/423 |
| 2018/0367793 A1* | 12/2018 | Park | H04N 19/11 |
| 2019/0089976 A1* | 3/2019 | Huang | H04N 19/33 |
| 2019/0327482 A1* | 10/2019 | Lin | H04N 19/513 |
| 2020/0404339 A1* | 12/2020 | Chernyak | H04N 19/176 |
| 2020/0413083 A1* | 12/2020 | Kobayashi | H04N 19/43 |

* cited by examiner

FIG. 2

Display Order

IMAGE CODING APPARATUS, IMAGE CODING METHOD, AND STORAGE MEDIUM

BACKGROUND OF THE INVENTION

Field of the Invention

The present invention relates to an image coding apparatus, an image coding method, and a storage medium.

Description of the Related Art

A technique called motion vector detection is used in encoding methods of H. 264 and its successor standard HEVC (High Efficiency Video Coding), which are international basic encoding standards for moving images. This is a technique to detect a motion with respect to each block to be encoded (encoding target block) between an image to be encoded from now (encoding target image) and a reference image that is temporally different therefrom and has already been encoded, and perform moving image compression while taking into account motion information thereof. In this way, the encoding efficiency can be enhanced (see "H.265/HEVC Textbook" by Sakae Ohkubo [Supervising Editor], Teruhiko Suzuki, Seishi Takamura, and Takeshi Chujoh [Co-Editors], First Copy of First Edition Issued on Oct. 21, 2013).

This motion vector detection performs motion detection with respect to each encoding target block in a certain, determined search range. With a large search area, the accuracy of motion vector detection is improved, but a circuit scale and a processing amount are increased. Also, when a search range representing a range smaller than the original motion is set, the motion cannot be tracked, thereby lowering the accuracy of motion vector detection and triggering degradation of image quality.

The encoding method of HEVC basically adopts what is called a prediction structure of a reference image set that includes eight reference frames.

Figure 2:
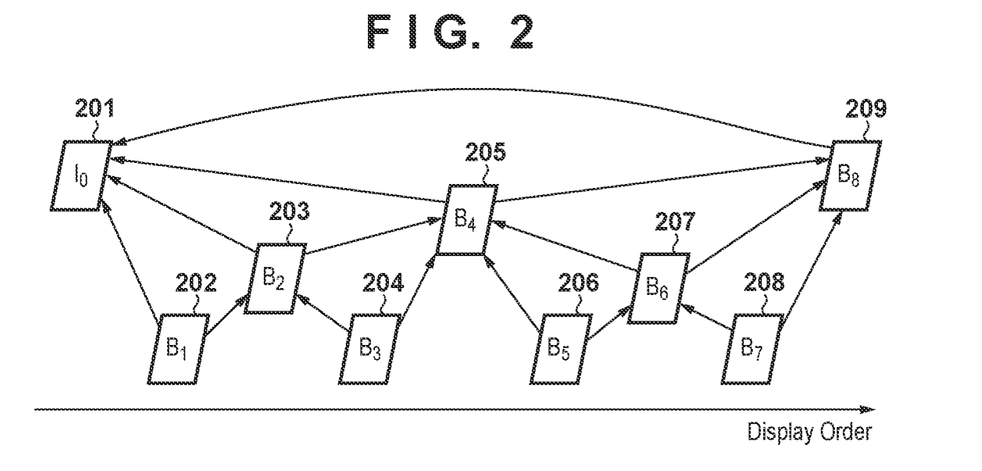
FIG. 2 is a diagram showing a prediction structure of a reference picture set.

FIG. 2 shows a prediction structure of a reference image set. There are images 201, 202, 203, 204, 205, 206, 207, 208, and 209 in a display order, and reference destinations of each image are indicated by arrows. One characteristic of this prediction structure of the reference image set is that some temporal distances to reference images are long. For example, the image 205 refers to the image 201 that is four images ahead and the image 209 that is four images behind. Also, the image 209 refers to the image 201 that is eight images ahead. When a temporal distance to a reference image is long as in this case, the motion of a subject is accordingly large, and it is necessary to enlarge a search range of motion vector detection.

In a case where motion vector detection is performed through hardware processing, a search range portion of a reference image retained in an external memory is read out and held in an internal memory, and then motion vector detection is performed. As a configuration of this internal memory that stores a reference image, a line buffer that holds a portion corresponding to the horizontal resolution of the image in the horizontal direction is often used. This is because, in reading out a reference image from the external memory, if a necessary reference image is read out for each encoding block without using the line buffer, the same pixel needs to be read out many times redundantly, thereby increasing a bus band for reading out image data from the external memory.

The line buffer for storing a reference image has a configuration whereby the size in the horizontal direction is the size of the horizontal resolution of the reference image, and the size in the vertical direction is the size required to perform a search in the vertical direction. As the capacity of the line buffer increases in proportion to the resolution, a circuit scale increases as the resolution increases. To address this issue, there is a technique to reduce the capacity of the line buffer for storing a reference image by changing the order of encoding by performing region division in an encoding target image (Japanese Patent Laid-Open No. 2018-32949).

In the encoding method of HEVC, a prediction structure has a reference image set including eight reference frames, and a temporal distance between an encoding target image and a reference image is eight images at most, i.e., long. Therefore, especially in a case where a temporal distance between an encoding target image and a reference image is long, it is necessary to search a larger region in motion vector detection. In order to enlarge a search range, it is necessary to increase the capacity of a line buffer for storing a reference image, which creates the problem of an increase in a circuit scale.

SUMMARY OF THE INVENTION

The present invention has been made in view of the foregoing situation. The present invention provides a technique to enable detection of motion vectors in a search range that conforms in size to a temporal distance between a target image and a reference image while suppressing an increase in the capacity of a line buffer for storing the reference image.

According to a first aspect of the present invention, there is provided an image coding apparatus, comprising: a detection unit configured to successively select each of a plurality of blocks as a target block and detect a motion vector of the target block by searching for a region that resembles the target block in a reference image that is partially stored in a storage unit, the plurality of blocks being obtained by dividing a target image in a horizontal direction and a vertical direction; and a control unit configured to, during motion vector detection by the detection unit, perform control to partially store the reference image into the storage unit so as to achieve a state where a search range for the target block in the reference image is stored in the storage unit, wherein the detection unit selects each of the plurality of blocks as the target block in an order of raster scan for each of N regions (N is a natural number) obtained by dividing the target image in the horizontal direction, and when a temporal distance between the target image and the reference image is a second distance that is longer than a first distance, a value of N is large compared to a case where the temporal distance is the first distance.

According to a second aspect of the present invention, there is provided an image coding method executed by an image coding apparatus, comprising: successively selecting each of a plurality of blocks as a target block and detecting a motion vector of the target block by searching for a region that resembles the target block in a reference image that is partially stored in a storage unit, the plurality of blocks being obtained by dividing a target image in a horizontal direction and a vertical direction; and during motion vector detection, performing control to partially store the reference image into the storage unit so as to achieve a state where a search range for the target block in the reference image is stored in the storage unit, wherein each of the plurality of blocks is selected as the target block in an order of raster scan for each of N regions (N is a natural number) obtained by dividing the target image in the horizontal direction, and when a temporal distance between the target image and the reference image is a second distance that is longer than a first distance, a value of N is large compared to a case where the temporal distance is the first distance.

According to a third aspect of the present invention, there is provided a non-transitory computer-readable storage medium which stores a program for causing a computer to execute an image coding method comprising: successively selecting each of a plurality of blocks as a target block and detecting a motion vector of the target block by searching for a region that resembles the target block in a reference image that is partially stored in a storage unit, the plurality of blocks being obtained by dividing a target image in a horizontal direction and a vertical direction; and during motion vector detection, performing control to partially store the reference image into the storage unit so as to achieve a state where a search range for the target block in the reference image is stored in the storage unit, wherein each of the plurality of blocks is selected as the target block in an order of raster scan for each of N regions (N is a natural number) obtained by dividing the target image in the horizontal direction, and when a temporal distance between the target image and the reference image is a second distance that is longer than a first distance, a value of N is large compared to a case where the temporal distance is the first distance.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 1:
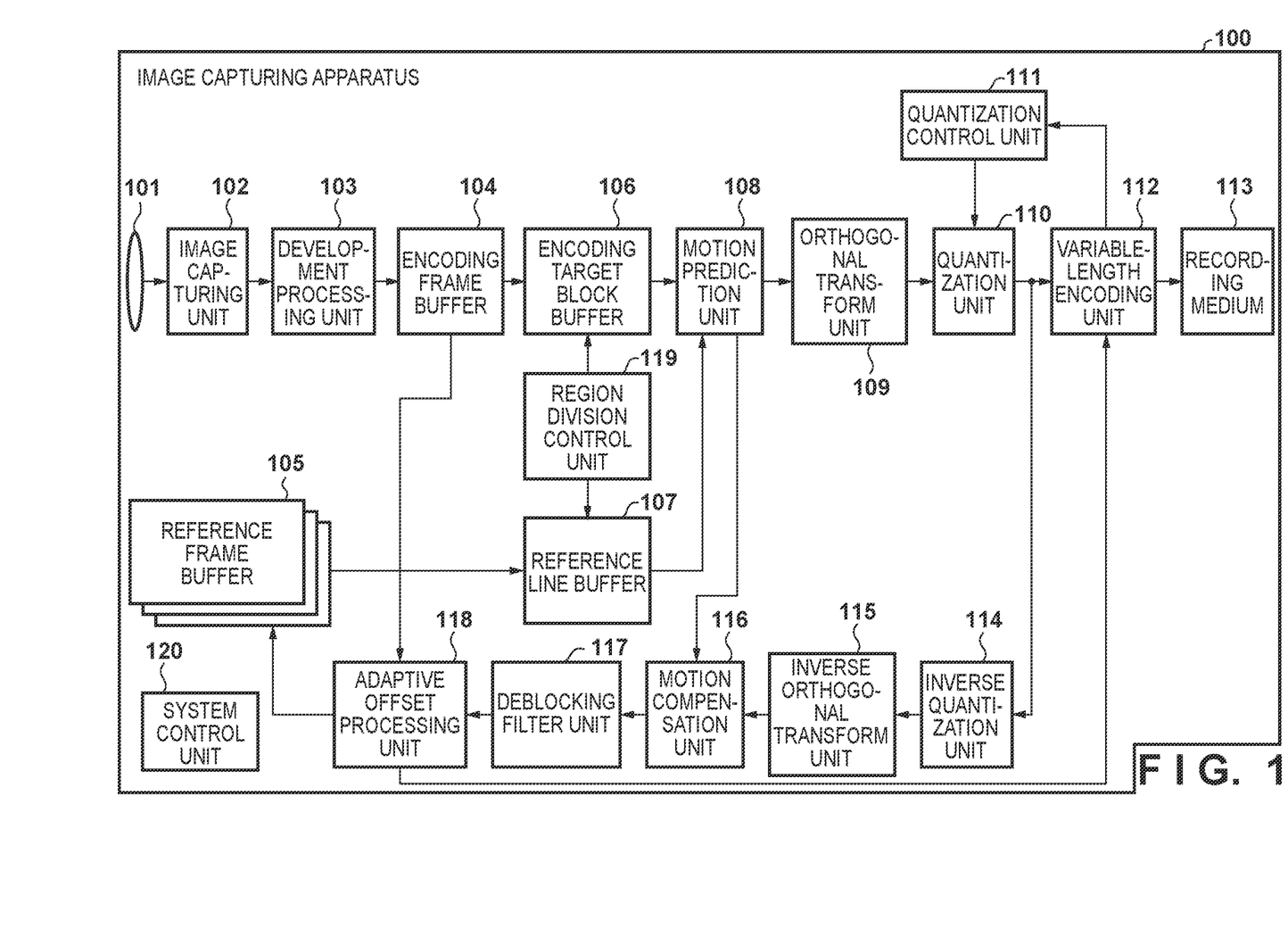
FIG. 1 is a block diagram showing a configuration of an image capturing apparatus 100.

FIG. 1 is a block diagram showing a configuration of an image capturing apparatus 100. The image capturing apparatus 100 includes an encoding apparatus, and the encoding apparatus includes an image coding apparatus. In the following description, it is assumed that the encoding apparatus performs encoding in compliance with the encoding method of HEVC, but the encoding method of the present embodiment is not limited to the encoding method of HEVC.

In FIG. 1, a subject image that has been shot is input to an image capturing unit 102 via a lens 101. The image capturing unit 102 converts the subject image into digital pixel data, and transmits the digital pixel data to a development processing unit 103. In the development processing unit 103, image processing, such as debayering processing, defect correction, noise removal, and color conversion into a YCbCr format, is performed. The image that has been placed into a format with which compression and encoding can be performed after the image processing, is input to an encoding frame buffer 104 as an encoding target image.

It is assumed that a DRAM (Dynamic Random Access Memory), which is an external memory, is used as each of the encoding frame buffer 104 that stores the encoding target image and a reference frame buffer 105 that stores reference images.

An encoding target block buffer 106 obtains and stores the encoding target image stored in the encoding frame buffer 104 on a per-block basis. It is assumed that this encoding target block buffer 106 is composed of an SRAM (Static Random Access Memory), which is an internal memory.

A reference line buffer 107 obtains a reference image that is necessary for motion vector detection from the reference frame buffer 105, and stores the reference image. It is assumed that the reference line buffer 107 is composed of an SRAM, which is an internal memory.

A motion prediction unit 108 performs motion vector detection by conducting block matching between the encoding target image stored in the encoding target block buffer 106 and the reference image stored in the reference line buffer 107. Then, the motion prediction unit 108 obtains pixel differences between encoding target blocks and reference blocks (prediction image) corresponding to the positions of the detected motion vectors, and outputs the differences (difference image) to an orthogonal transform unit 109. The motion prediction unit 108 also outputs the prediction image to a motion compensation unit 116 for the generation of a local decoded image.

The orthogonal transform unit 109 generates a transform coefficient by performing a discrete cosine transform with respect to the transmitted difference image, and outputs the transform coefficient to a quantization unit 110. The quantization unit 110 performs quantization with respect to the transform coefficient transmitted from the orthogonal transform unit 109 in accordance with a quantization step size output from a quantization control unit 111. The quantized transform coefficient is output to a variable-length encoding unit 112 for the generation of an encoded stream. The quantized transform coefficient is also output to an inverse quantization unit 114 for the generation of the local decoded image.

The variable-length encoding unit 112 performs variable-length encoding by performing zig-zag scan, alternate scan, and the like with respect to the transform coefficient after the quantization. The variable-length encoding unit 112 also generates the encoded stream by adding, to code data of the encoding target image, the result of variable-length encoding of encoding method information, such as the motion vectors, the quantization step size, block division information, and parameters for adaptive offset processing. The generated encoded stream is recorded into a recording medium 113. Furthermore, the variable-length encoding unit 112 calculates the amounts of generated codes for respective blocks at the time of encoding, and outputs them to the quantization control unit 111.

Using the amounts of generated codes transmitted from the variable-length encoding unit 112, the quantization control unit 111 determines the quantization step size so as to achieve the intended amounts of codes, and outputs the determined quantization step size to the quantization unit 110.

The inverse quantization unit 114 performs inverse quantization with respect to the transform coefficient after the quantization transmitted from the quantization unit 110, thereby generating a transform coefficient for local decoding. This transform coefficient is output to an inverse orthogonal transform unit 115.

The inverse orthogonal transform unit 115 generates a difference image by performing an inverse discrete cosine transform with respect to the transmitted transform coefficient. The generated difference image is output to the motion compensation unit 116. The motion compensation unit 116 generates image data for local decoding by adding the prediction image transmitted from the motion prediction unit 108 and the difference image transmitted from the inverse orthogonal transform unit 115. The generated image data is output to a deblocking filter unit 117.

The deblocking filter unit 117 applies a deblocking filter to the transmitted image data. The image after deblocking filtering is output to an adaptive offset processing unit 118.

The adaptive offset processing unit 118 selects one of band offset processing, edge offset processing, and no execution of processing, and determines a band position, an edge direction, an offset value, and the like with which adaptive offset processing is performed. The image to which the adaptive offset processing has been applied (or has not been applied) is stored into the reference frame buffer 105 as a local decoded image. The adaptive offset processing unit 118 also outputs parameters for the adaptive offset processing, including which processing has been selected as the adaptive offset processing, the band position, the edge direction, the offset value, and the like, to the variable-length encoding unit 112 so that they are generated as the encoded stream. Through the foregoing operations, the encoded stream and the local decoded image are generated.

A system control unit 120 includes a ROM that stores a control program and a RAM that is used as a working memory, and controls the entirety of the image capturing apparatus 100 by executing the control program.

According to the HEVC standard, a technique called tile division has been introduced. This divides an image into a plurality of tiles, and the order in which CTUs (Coding Tree Units), which are encoding target blocks, are encoded changes in accordance with the form of division. When tile division is performed, a region division control unit 119 issues an instruction for tile division to the encoding target block buffer 106 and the reference line buffer 107, and the order of portions to be obtained in an encoding target image and a reference image changes.

Figure 3:
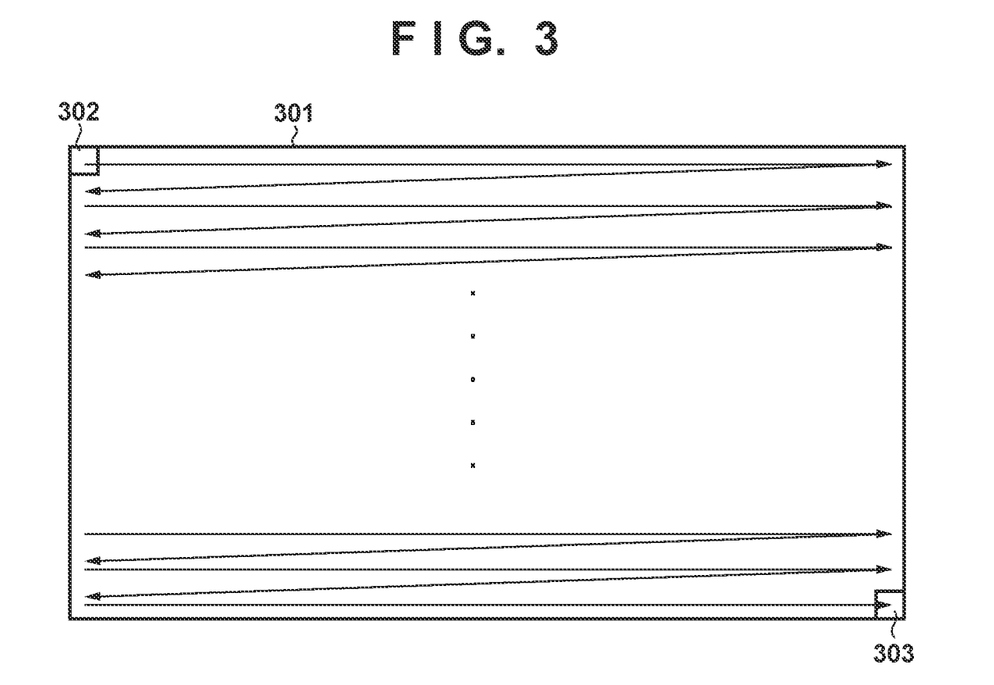
FIG. 3 is a diagram showing the order of encoding for the case where tile division is not performed.

FIG. 3 shows the order of encoding for the case where tile division is not performed. Processing is performed with respect to an encoding target image 301 in the raster order (the order of raster scan), starting from an upper-left CTU 302. That is to say, processing is performed in order in the rightward direction from the upper-left CTU, and when processing of a rightmost CTU has finished, processing of a leftmost CTU immediately below is performed. In this order, processing is performed up until a lower-right CTU 303 of the image.

Figure 4:
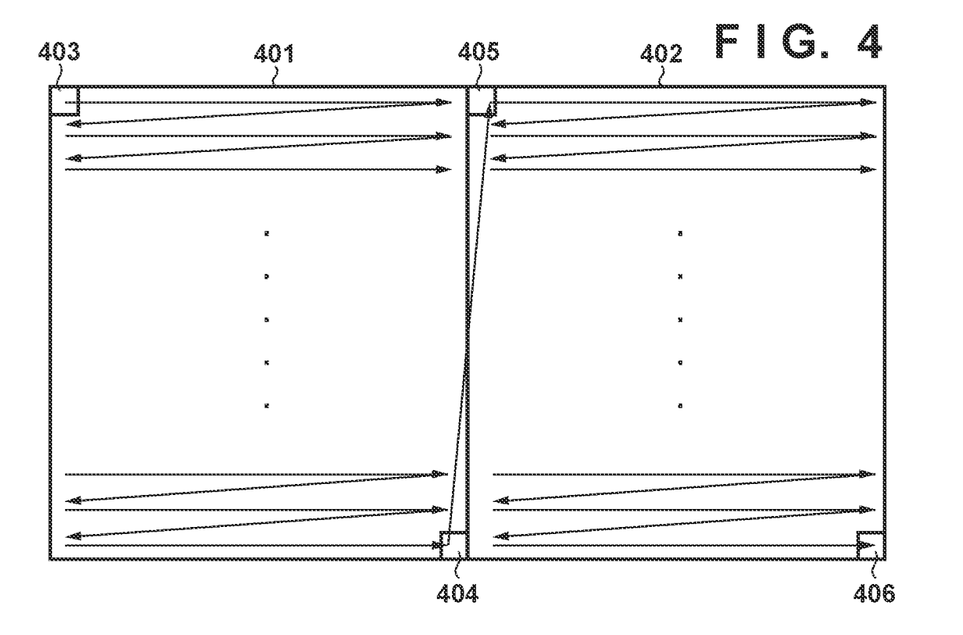
FIG. 4 is a diagram showing the order of encoding for the case where tile division is performed in such a manner that an encoding target image is divided into two in a horizontal direction (left-right).

FIG. 4 shows the order of encoding for the case where tile division is performed in such a manner that an encoding target image is divided into two in the horizontal direction (left-right). First, processing is performed in the raster order within a left tile 401. That is to say, processing is started from an upper-left CTU 403 of the left tile 401, and processing is performed successively up until a lower-right CTU 404 of the left tile. Thereafter, processing moves on to an upper-left CTU 405 of a right tile 402, processing is performed in the raster order within the right tile 402, and processing is performed successively up until a lower-right CTU 406. In this way, when tile division is performed in the horizontal direction, the order of encoding processing changes.

Figure 5:
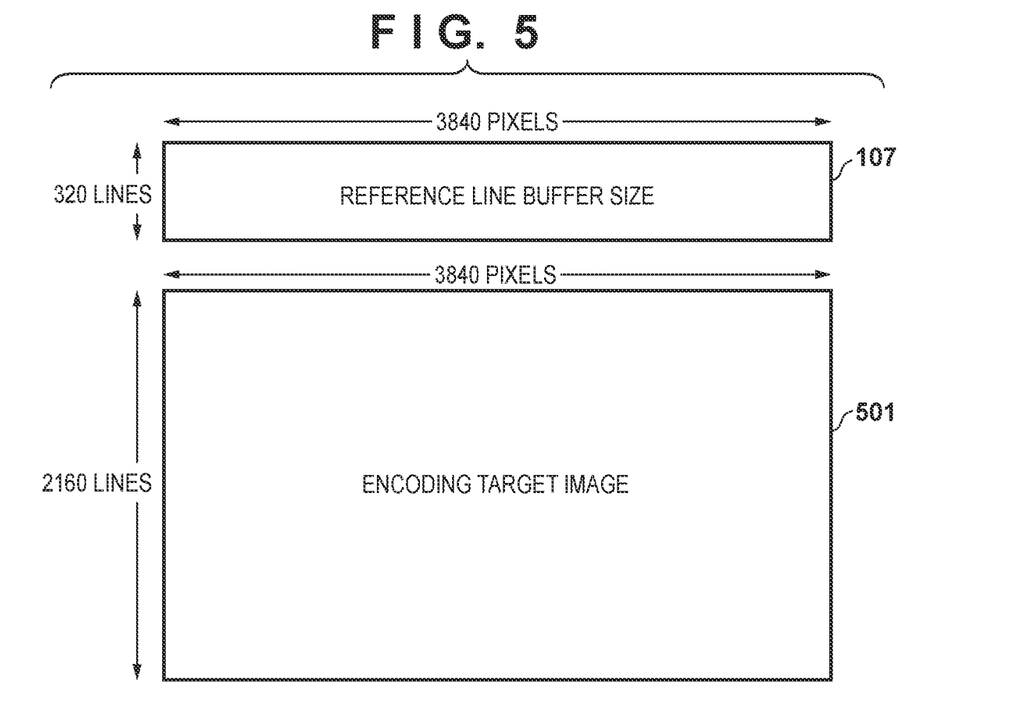
FIG. 5 is a diagram for describing the horizontal sizes and the vertical sizes of an encoding target image and a reference line buffer 107 for the case where tile division is not performed.

Next, the method of using the reference line buffer 107 is described. FIG. 5 is a diagram showing the horizontal sizes and the vertical sizes of an encoding target image and the reference line buffer 107 for the case where tile division is not performed. The example of FIG. 5 is described under the assumption that the resolution of an encoding target image 501 is 3840×2160, and a search range of motion vector detection for the case where tile division is not performed is ±256 pixels in the horizontal direction and ±128 lines in the vertical direction.

In the case where tile division is not performed, the horizontal size of the reference line buffer 107 is the horizontal resolution, hence 3840 pixels. The vertical size of the reference line buffer 107 is the search range in the vertical direction+the CTU size in the vertical direction (assumed to be 64 lines here), hence 320 lines. Therefore, the pixel size of the reference line buffer 107 is 3840×320=1228800 pixels.

Figure 6:
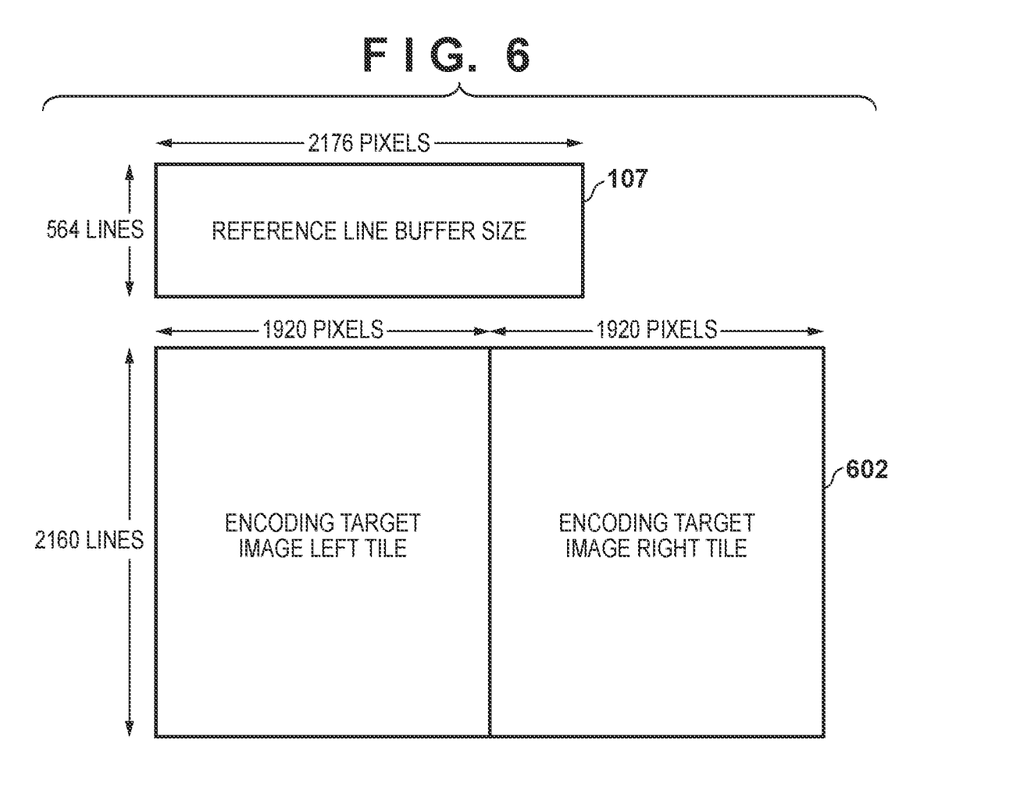
FIG. 6 is a diagram for describing the horizontal sizes and the vertical sizes of an encoding target image and the reference line buffer 107 for the case where tile division of dividing the encoding target image into two in the horizontal direction (left-right) has been performed.

Next, with reference to FIG. 6, a description is given of the horizontal sizes and the vertical sizes of an encoding target image and the reference line buffer 107 for the case where tile division of dividing the encoding target image into two in the horizontal direction (left-right) has been performed.

In the case where tile division of left-right division into two has been performed, while a search range of motion vector detection in the horizontal direction is ±256 pixels similarly to the case where division is not performed, a search range in the vertical direction can be large compared to the case where division is not performed. In the case where tile division of left-right division into two has been performed, the order of encoding CTUs changes from the case where division is not performed, and thus the horizontal size of the reference line buffer 107 is the horizontal tile size+search range. As a left tile 601 and a right tile 602 are both halves of 3840 pixels, the horizontal tile size is 1920 pixels. As the search range in the horizontal direction is 256 pixels, the horizontal size of the reference line buffer 107 is 1920+256=2176 pixels.

As the reference line buffer 107 has a pixel size of 1228800 pixels and a horizontal size of 2176 pixels, it can have a vertical size of 1228800/2176=564 lines. The vertical search range can be ±250 lines because, based on the vertical CTU size of 64 lines, (564−64)/2=250. In this way, performing tile division in the horizontal direction can enlarge the vertical search range.

Figure 7:
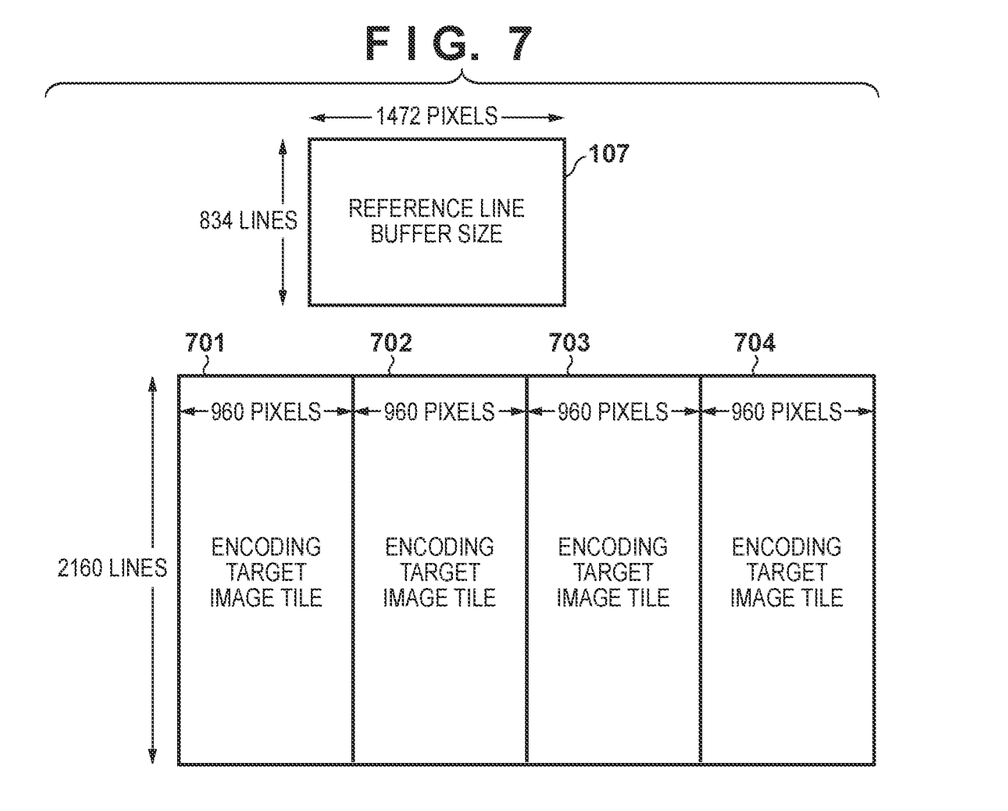
FIG. 7 is a diagram for describing the horizontal sizes and the vertical sizes of an encoding target image and the reference line buffer 107 for the case where tile division of dividing the encoding target image into four in the horizontal direction (left-right) has been performed.

Next, with reference to FIG. 7, a description is given of the horizontal sizes and the vertical sizes of an encoding target image and the reference line buffer 107 for the case where tile division of dividing the encoding target image into four in the horizontal direction (left-right) has been performed.

With respect to each of a tile 701, a tile 702, a tile 703, and a tile 704, the horizontal tile size is a quarter of 3840 pixels, hence 960 pixels. As a search range in the horizontal direction is 256 pixels, and pixels corresponding to the search range are necessary for the tile 702 and the tile 703 in both of the left and right directions, the horizontal size of the reference line buffer 107 is 960+256+256=1472 pixels.

As the reference line buffer 107 has a pixel size of 1228800 pixels and a horizontal size of 1472 pixels, it can have a vertical size of 1228800/1472=834 lines. A vertical search range can be ±385 lines because, based on the vertical CTU size of 64 lines, (834−64)/2=385. In this way, increasing the number of divisions in the horizontal direction can further enlarge the vertical search range.

Figure 8:
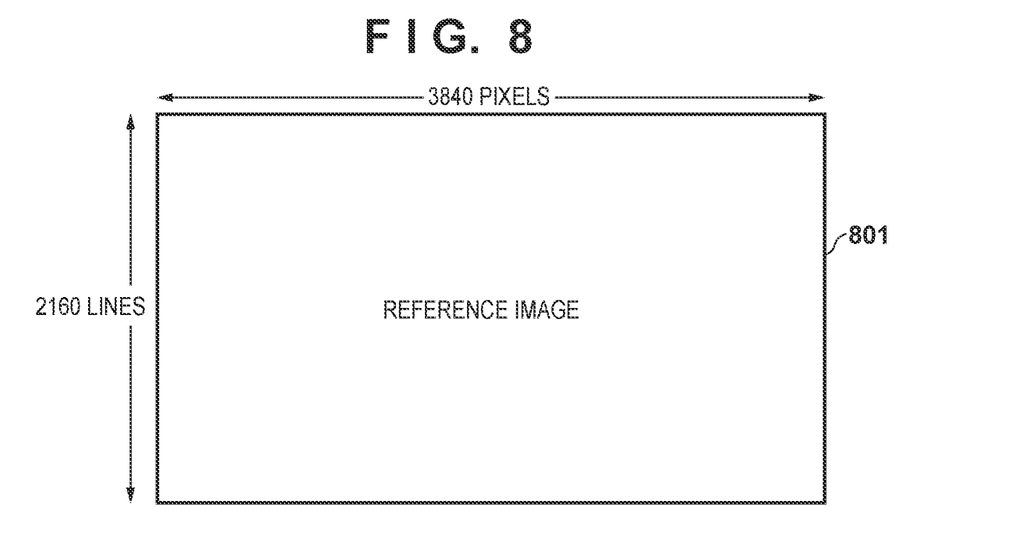
FIG. 8 is a diagram for describing a total amount of readout of a reference image for the case where division is not performed.
Figure 9:
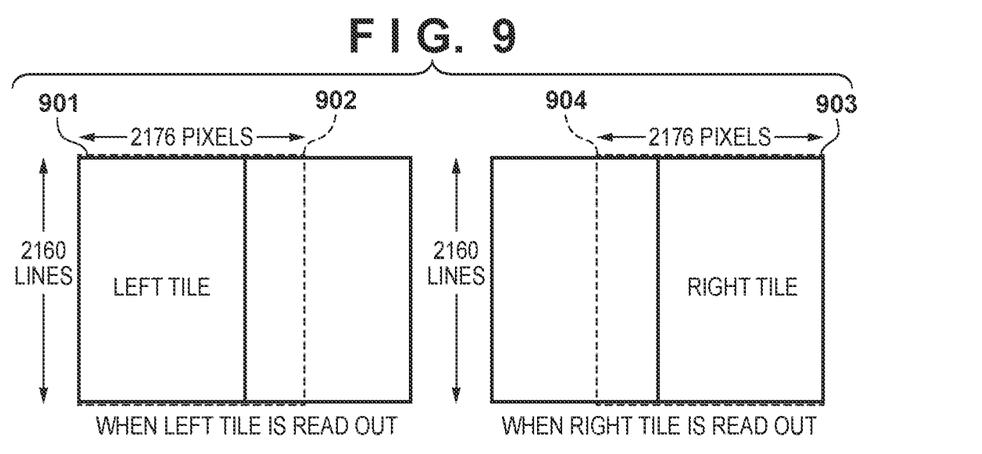
FIG. 9 is a diagram for describing a total amount of readout of a reference image for the case of left-right division into two.
Figure 10:
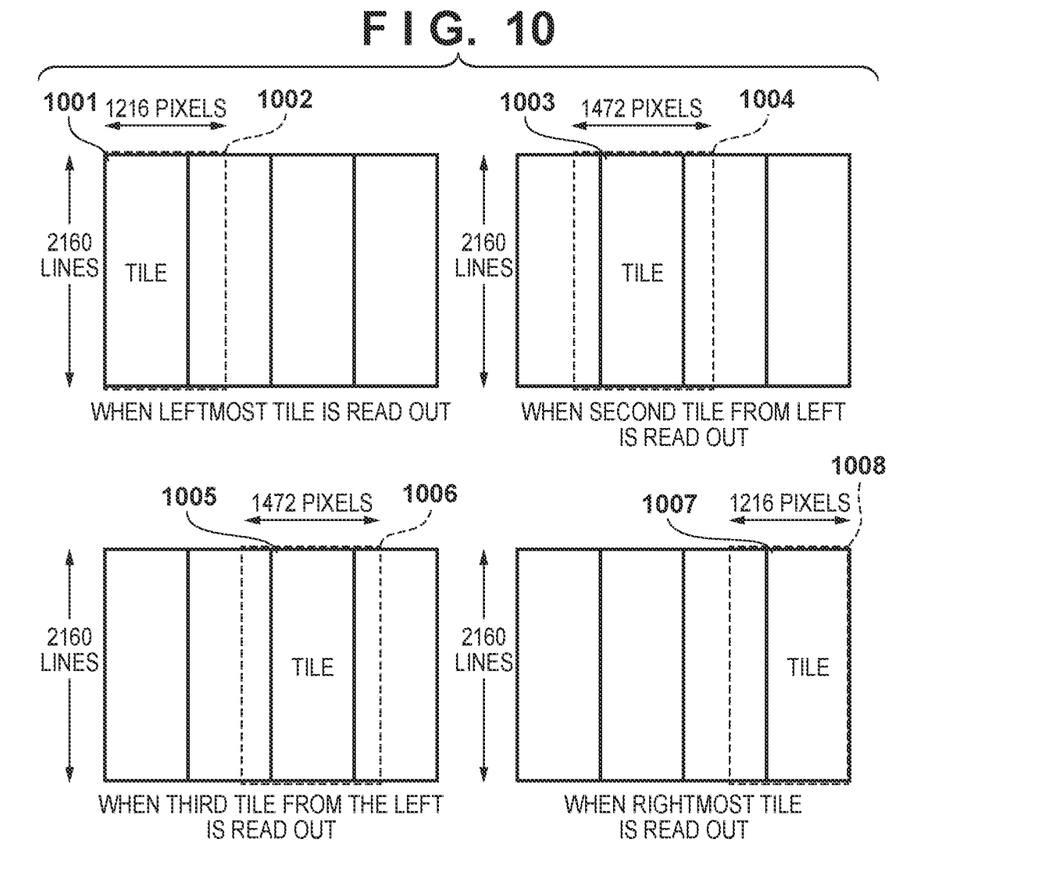
FIG. 10 is a diagram for describing a total amount of readout of a reference image for the case of left-right division into four.

With reference to FIG. 8 to FIG. 10, a description is given of a total amount of readout of a reference image for the case where division is not performed, for the case of left-right division into two, and for the case of left-right division into four. FIG. 8 is a diagram for describing a total amount of readout of a reference image for the case where division is not performed. In the case where division is not performed, a reference image 801 is read out on a per-line basis into the reference line buffer 107 in order from top pixels, and a line that has become unnecessary is replaced; in this way, each pixel is read only once. Therefore, a total amount of readout is the same as the image size: 3840 pixels horizontally×2160 lines vertically, hence 8294400 pixels.

FIG. 9 is a diagram for describing a total amount of readout of a reference image for the case of left-right division into two. At the time of encoding processing, first, a reference image is read out with respect to a left tile 901. Readout into the reference line buffer 107 is performed on a per-line basis in order from top pixels of the left tile 901. Here, the line buffer size in the horizontal direction is the horizontal size of the left tile+a horizontal search range in the rightward direction. As the horizontal tile size is 1920 pixels and the horizontal search range is 256 pixels, the line buffer size in the horizontal direction is 2176 pixels. Similarly to the case where division is not performed, readout is performed on a per-line basis, and a line that has become unnecessary is replaced. As a result, the amount of readout of a reference image readout range 902 for the left tile 901 is 2176 pixels horizontally×2160 lines vertically, hence 4700160 pixels.

With respect to a right tile 903, similarly to the left tile 901, the line buffer size in the horizontal direction is the size of the right tile+a horizontal search range in the leftward direction, hence 2176 pixels. Therefore, as with the case of the left tile 901, the amount of readout of a reference image readout range 904 for the right tile 903 is 4700160 pixels.

Thus, in the case of left-right division into two, the total amount of readout of the reference image is 4700160× 2=9400320 pixels. This is an increase by 1105920 pixels compared to the total amount of readout for the case where division is not performed (8294400 pixels).

FIG. 10 is a diagram for describing a total amount of readout of a reference image for the case of left-right division into four. The line buffer size for a leftmost tile 1001 in the horizontal direction is the horizontal tile size+a horizontal search range in the rightward direction, hence 960+256=1216 pixels. The amount of readout of a reference image readout range 1002 for the tile 1001 is 1216 pixels× 2160 lines=2626560 pixels.

The line buffer size for the second tile 1003 from the left in the horizontal direction is the horizontal tile size+a horizontal search range in the rightward and leftward directions, hence 960+256+256=1472 pixels. The amount of readout of a reference image readout range 1004 for the tile 1003 is 1472 pixels×2160 lines=3179520 pixels.

With respect to the third tile 1005 from the left, based on the calculation similar to that for the case of the tile 1003, the amount of readout of a reference image readout range 1006 is 3179520 pixels.

With respect to a rightmost tile 1007, based on the calculation similar to that for the case of the tile 1001, the amount of readout of a reference image readout range 1008 is 2626560 pixels.

Summing the amounts of readout of the readout ranges 1002, 1004, 1006, and 1008 yields 2626560+3179520+ 3179520+2626560=11612160 pixels as the total amount of readout of the reference image for the case of left-right division into four. This is an increase by 3317760 pixels compared to the total amount of readout for the case where division is not performed (8294400 pixels), and an increase by 2211840 pixels compared to the total amount of readout for the case of left-right division into two (9400320 pixels).

In the above-described manner, the larger the number of divisions in the horizontal direction (left-right direction), the larger the total amount of readout of the reference image. Therefore, the larger the number of divisions in the horizontal direction, the larger the amount of consumption of the bus band for DRAM readout.

In order to set an appropriate search range while keeping the consumption of the bus band to a minimum, the image capturing apparatus 100 changes the number of tile divisions in accordance with the position of an encoding target image (a temporal distance to a reference image) within a prediction structure of a reference picture set.

With reference to FIG. 2, a description is given of a relationship between the position of an encoding target image within the prediction structure of the reference picture set and the number of tile divisions. When the encoding target image is the image 202, 204, 206, or 208, a temporal distance to a reference image corresponds to one image. When the encoding target image is the image 203 or 207, a temporal distance to a reference image corresponds to two images. Similarly, when the encoding target image is the image 205, a temporal distance to a reference image corresponds to four images, and when the encoding target image is the image 209, a temporal distance to a reference image corresponds to eight images.

As a temporal distance between an encoding target image and a reference image increases, the motion of a subject relatively increases, and thus it is favorable to enlarge a search range of motion vector detection. In view of this, when the encoding target image is the image 202, 203, 204, 206, 207, or 208, as a temporal distance to a reference image corresponds to two images or less, i.e., short, division is not performed. When the encoding target image is the image 205, as a temporal distance to a reference image corresponds to four images, tile division of left-right division into two is performed. When the encoding target image is the image 209, as a temporal distance to a reference image corresponds to eight images, tile division of left-right division into four is performed.

In the above-described manner, the number of tile divisions in the horizontal direction is changed in accordance with a position within the prediction structure of the reference picture set, in consideration of a relationship between an encoding target image and a temporal distance to a reference image. In this way, when a temporal distance between an encoding target image and a reference image is long, the search range of motion vector detection can be enlarged without increasing a circuit scale. Also, when a temporal distance between an encoding target image and a reference image is short, the number of tile divisions in the horizontal direction can be kept small, and thus an increase in the bus band for DRAM readout can be suppressed.

Note that the relationship between a position of an encoding target image within the prediction structure of the reference picture set and the number of tile divisions is not limited to the above-described relationship, and may be any relationship. For example, it is also possible to adopt a configuration in which tile division of left-right division into two is performed with respect to the image 209 that has the longest temporal distance to a reference image, and tile division is not performed with respect to other images.

Figure 11:
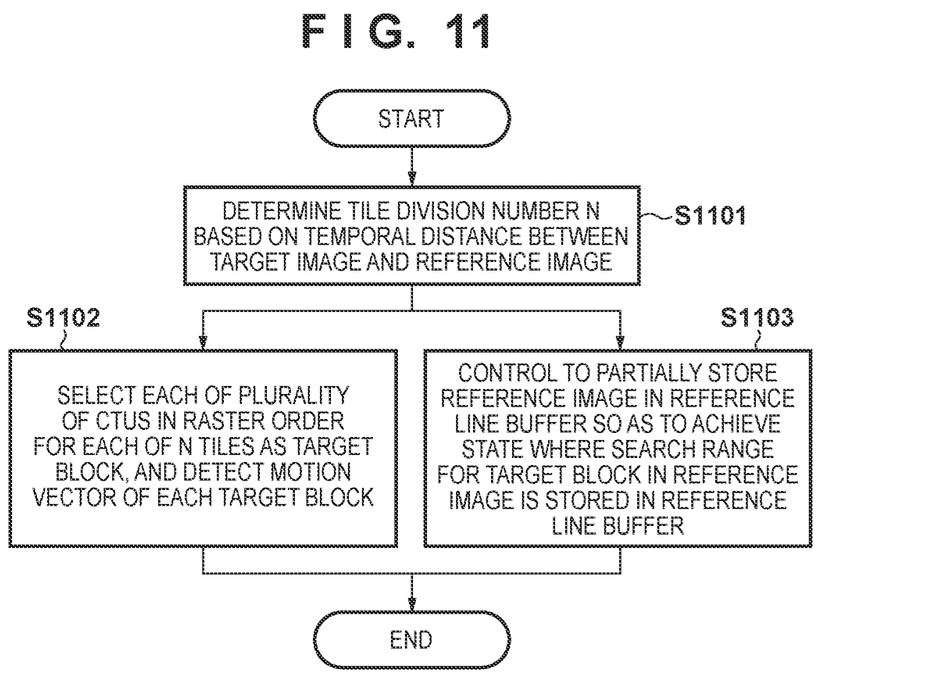
FIG. 11 is a flowchart of motion vector detection processing.

FIG. 11 is a flowchart of motion vector detection processing. In the description of the present flowchart, focus is placed on motion vector detection processing executed by the image capturing apparatus 100, and a description of other processing, such as encoding processing, is omitted. Therefore, in the description of the present flowchart, an encoding target image is simply referred to as a "target image", and an encoding target block is simply referred to as a "target block".

In step S1101, the system control unit 120 determines the number N of tile divisions (N is a natural number) based on a temporal distance between a target image and a reference image. The specifics of the determination method are as described with reference to FIG. 5 to FIG. 7; the longer the temporal distance, the larger the value of N. The system control unit 120 notifies the region division control unit 119 of the determined value of N, and the region division control unit 119 controls the encoding target block buffer 106 and the reference line buffer 107 based on the value of N.

In step S1102, the system control unit 120 selects a plurality of CTUs respectively as target blocks in the raster order for each of N tiles, and performs control so that the target blocks are input from the encoding frame buffer 104 to the encoding target block buffer 106. The specifics of this selection in the raster order are as described with reference to FIG. 3 and FIG. 4. Then, the system control unit 120 controls the motion prediction unit 108 so as to detect motion vectors of the respective target blocks. The motion prediction unit 108 detects motion vectors of the target blocks by searching for regions that resemble the target blocks in the reference image that is partially stored in the reference line buffer 107.

In parallel to the process of step S1102 (i.e., during the detection of motion vectors), in step S1103, the system control unit 120 performs control to partially store the reference image in the reference frame buffer 105 into the reference line buffer 107. At this time, the system control unit 120 performs control so that a search range for the target blocks is in the state where it is stored in the reference line buffer 107.

Note that in the case of FIG. 5, although tile division is not performed in reality, it is assumed that the state of FIG. 5 is expressed in such a manner that the number of tile divisions is one, using the term "divisions" for the sake of convenience. Therefore, in the present application, for example, the expression "N tiles (N regions) obtained by dividing a target image in a horizontal direction" encompasses the state where tile division is not performed as shown in FIG. 5 when N=1. Similarly, the expression "select a plurality of CTUs respectively as target blocks in a raster order for each of N tiles (N regions)" encompasses a selection in the raster order in a target image that has not been divided into tiles as shown in FIG. 3 when N=1.

Also, the target image and the reference image mentioned in the description of the present flowchart of FIG. 11 are generated by the image capturing unit 102. The target image is one of a plurality of images that compose the prediction structure of the reference picture set according to the HEVC standard, and the reference image is another image that is within the prediction structure of the reference picture set and that is selected based on the position of the target image within the prediction structure of the reference picture set. As can be understood from FIG. 2, once the position of the target image within the prediction structure of the reference picture set has been determined, a temporal distance between the target image and the reference image is determined. Therefore, the determination of the number N of tile divisions in step S1101 may be made based on the position of the target image within the prediction structure of the reference picture set.

As described above, according to the first embodiment, in performing motion vector detection, the image capturing apparatus 100 selects target blocks in the order of raster scan for each of N regions (tiles) obtained by dividing a target image in the horizontal direction. The value of N is determined based on a temporal distance between a target image and a reference image. For example, the value of N is one when the temporal distance corresponds to one image (first distance), the value of N is two when the temporal distance corresponds to four images (second distance), and the value of N is four when the temporal distance corresponds to eight images (third distance).

With such a configuration, motion vectors can be detected in a search range that conforms in size to a temporal distance between the target image and the reference image while suppressing an increase in the capacity of the reference line buffer 107. In addition, when the temporal distance between the target image and the reference image is short, the number of tile divisions is small, and thus it is also possible to suppress an increase in a total amount of readout of the reference image.

Note that although the present embodiment has been described using the encoding method of HEVC as an example, the present embodiment can be applied to any encoding method as long as region division is used.

Second Embodiment

A second embodiment will be described in relation to a configuration in which the number of tile divisions in the horizontal direction is changed in accordance with TemporalID. In the second embodiment, the basic configuration of the image capturing apparatus 100 is similar to that of the first embodiment (see FIG. 1). The following mainly describes differences from the first embodiment.

According to the encoding method of HEVC, with the presence of a flag called TemporalID, it is possible to perform decoding from the same encoded stream at different frame rates.

Figure 12:
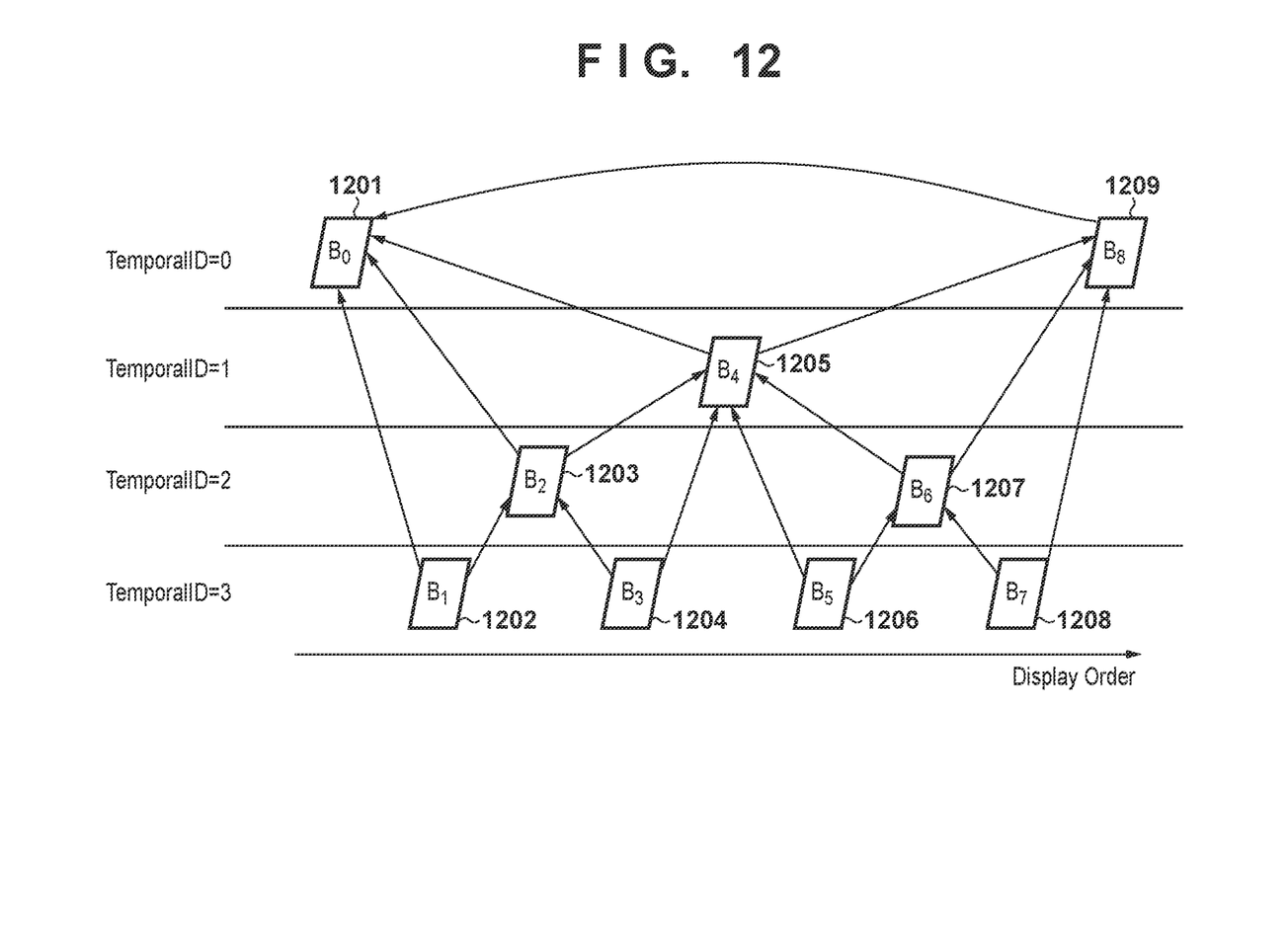
FIG. 12 is a diagram showing an example of a prediction structure of a reference picture set having a hierarchical structure based on TemporalID.

FIG. 12 shows an example of TemporalID. For images 1201 and 1209, TemporalID=0. For an image 1205, TemporalID=1. Similarly, for images 1203 and 1207, TemporalID=2, and for images 1202, 1204, 1206, and 1208, TemporalID=3.

The encoding method of HEVC has the rule that an image that can be used as a reference image is an image with TemporalID that is the same as or smaller than an encoding target image. Based on this rule, when a plurality of TemporalIDs are given to an encoded stream, decoding can be performed using only a set with small TemporalIDs.

For example, when decoding is performed with respect to TemporalID=2 or less in FIG. 12, every reference image has TemporalID=0 or 1. Therefore, a decoding operation is completed only with decoding of an encoded stream with TemporalID=2 or less, without decoding an encoded stream with TemporalID=3.

In this case, compared to the case where all encoded streams are decoded and reproduced, the number of images that are decoded is ½, and thus reproduction at a half frame rate can be performed.

Due to the above-described relationship, images with smaller TemporalID are encoded earlier. That is to say, there is a tendency that a temporal distance between an encoding target image and a reference image at the time of actual reproduction becomes long.

In view of this, the image capturing apparatus 100 changes a search range by changing the number of divisions of the encoding target image in the horizontal direction in accordance with TemporalID.

For example, when the images 1201, 1205, and 1209 with TemporalID=0 and 1 are encoding target images, the temporal distances between the encoding target images and reference images are relatively long, and thus the image capturing apparatus 100 performs tile division of left-right division into two. Also, when the images 1202, 1203, 1204, 1206, 1207, and 1208 with TemporalID=2 and 3 are encoding target images, the temporal distances between the encoding target images and reference images are relatively short, and thus the image capturing apparatus 100 does not performs tile division.

In the above-described manner, the image capturing apparatus 100 changes a search range of motion vector detection by changing the number of tile divisions of an encoding target image in the horizontal direction in accordance with TemporalID. In this way, an appropriate search range of motion vector detection can be obtained and favorable images can be obtained without increasing a circuit scale. At this time, the number of region divisions in the horizontal direction can be minimized, and thus an increase in the bus band for DRAM readout can be minimized.

Motion vector detection processing in the second embodiment is substantially the same as that in the first embodiment (see FIG. 11). However, the determination of the number N of tile divisions in step S1101 is made based on the value of TemporalID of a target image. The target image is one of a plurality of images that compose a prediction structure of a reference picture set that has a hierarchical structure based on TemporalID according to the HEVC standard, and the reference image is another image that is within the prediction structure of the reference picture set and that is selected based on the position of the target image within the prediction structure of the reference picture set. As can be understood from FIG. 12, once the value of TemporalID of the target image has been determined, a temporal distance between the target image and the reference image is determined. Therefore, processing for determining the number N of tile divisions based on the temporal distance between the target image and the reference image can be realized by determining the number N of tile divisions based on the value of TemporalID.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-119014, filed on Jun. 26, 2019, which is hereby incorporated by reference herein in its entirety.

What is claimed is:
1. An image coding apparatus, comprising:
a detection unit configured to successively select each of a plurality of blocks as a target block and detect a motion vector of the target block by searching for a region that resembles the target block in a reference image that is partially stored in a storage unit, the plurality of blocks being obtained by dividing a target image in a horizontal direction and a vertical direction; and a control unit configured to, during motion vector detection by the detection unit, perform control to partially store the reference image into the storage unit so as to achieve a state where a search range for the target block in the reference image is stored in the storage unit, wherein the detection unit selects each of the plurality of blocks as the target block in an order of raster scan for each of N regions (N is a natural number) obtained by dividing the target image in the horizontal direction, and when a temporal distance between the target image and the reference image is a second distance that is longer than a first distance, a value of N is large compared to a case where the temporal distance is the first distance.

2. The image coding apparatus according to claim 1, wherein when the temporal distance is a third distance that is longer than the second distance, the value of N is large compared to a case where the temporal distance is the second distance.

3. The image coding apparatus according to claim 1, wherein when the temporal distance is the first distance, the value of N is one.

4. The image coding apparatus according to claim 1, wherein the target image is one of a plurality of images that compose a prediction structure of a reference picture set according to an HEVC standard, the reference image is another image that is within the prediction structure of the reference picture set and that is selected based on a position of the target image within the prediction structure of the reference picture set, and the detection unit determines the value of N based on the position of the target image within the prediction structure of the reference picture set.

5. The image coding apparatus according to claim 1, wherein the target image is one of a plurality of images that compose a prediction structure of a reference picture set that has a hierarchical structure based on TemporalID according to an HEVC standard, the reference image is another image that is within the prediction structure of the reference picture set and that is selected based on a position of the target image within the prediction structure of the reference picture set, and the detection unit determines the value of N based on a value of TemporalID of the target image.

6. An image coding method executed by an image coding apparatus, comprising:

successively selecting each of a plurality of blocks as a target block and detecting a motion vector of the target block by searching for a region that resembles the target block in a reference image that is partially stored in a storage unit, the plurality of blocks being obtained by dividing a target image in a horizontal direction and a vertical direction; and during motion vector detection, performing control to partially store the reference image into the storage unit so as to achieve a state where a search range for the target block in the reference image is stored in the storage unit, wherein each of the plurality of blocks is selected as the target block in an order of raster scan for each of N regions (N is a natural number) obtained by dividing the target image in the horizontal direction, and when a temporal distance between the target image and the reference image is a second distance that is longer than a first distance, a value of N is large compared to a case where the temporal distance is the first distance.

7. A non-transitory computer-readable storage medium which stores a program for causing a computer to execute an image coding method comprising:

successively selecting each of a plurality of blocks as a target block and detecting a motion vector of the target block by searching for a region that resembles the target block in a reference image that is partially stored in a storage unit, the plurality of blocks being obtained by dividing a target image in a horizontal direction and a vertical direction; and during motion vector detection, performing control to partially store the reference image into the storage unit so as to achieve a state where a search range for the target block in the reference image is stored in the storage unit, wherein each of the plurality of blocks is selected as the target block in an order of raster scan for each of N regions (N is a natural number) obtained by dividing the target image in the horizontal direction, and when a temporal distance between the target image and the reference image is a second distance that is longer than a first distance, a value of N is large compared to a case where the temporal distance is the first distance.

* * * * *